(12) United States Patent
Duron et al.

(10) Patent No.: US 7,902,984 B2
(45) Date of Patent: Mar. 8, 2011

(54) SINGLE FREQUENCY LOW POWER RFID DEVICE

(75) Inventors: Mark Duron, East Patchogue, NY (US); James Giebel, Centerport, NY (US); David Goren, Smithtown, NY (US); Thomas Wulff, No. Patchogue, NY (US); Richard T. Knadle, Jr., Dix Hills, NY (US); Christopher Brock, Manorville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 3 days.

(21) Appl. No.: 12/498,884

(22) Filed: Jul. 7, 2009

(65) Prior Publication Data

US 2010/0001842 A1 Jan. 7, 2010

Related U.S. Application Data

(62) Division of application No. 11/529,733, filed on Sep. 29, 2006, now Pat. No. 7,576,657.

(60) Provisional application No. 60/784,450, filed on Mar. 22, 2006.

(51) Int. Cl.
*G08B 13/14* (2006.01)
(52) U.S. Cl. .................. 340/572.1; 340/10.1; 703/13
(58) Field of Classification Search ............... 340/572.1, 340/572.4, 572.7, 10.1, 10.2, 10.3; 703/13
See application file for complete search history.

(56) References Cited

U.S. PATENT DOCUMENTS

| | | | |
|---|---|---|---|
| 5,241,163 A * | 8/1993 | Vachtsevanos et al. ....... | 235/375 |
| 5,675,342 A | 10/1997 | Sharpe | |
| 5,686,902 A | 11/1997 | Reis et al. | |
| 5,884,278 A * | 3/1999 | Powell ........................... | 235/375 |
| 5,995,019 A | 11/1999 | Chieu et al. | |
| 6,070,803 A | 6/2000 | Stobbe | |
| 6,107,910 A | 8/2000 | Nysen | |
| 6,317,027 B1 | 11/2001 | Watkins | |
| 6,330,971 B1 | 12/2001 | Mabry et al. | |

(Continued)

OTHER PUBLICATIONS

Ex Parte Quayle Action dated Feb. 2, 2009 in parent U.S. Appl. No. 11/529,733. Restriction dated Dec. 4, 2008 in parent U.S. Appl. No. 11/529,733.
International Search Report dated Feb. 26, 2008 in related counterpart PCT/US2007/063805.

*Primary Examiner* — Thomas J Mullen
(74) *Attorney, Agent, or Firm* — Terri S. Hughes

(57) ABSTRACT

Methods, systems, and apparatuses for a reader transceiver circuit are described. The reader transceiver circuit incorporates a frequency generator, such as a surface acoustic wave (SAW) oscillator. A reader incorporating the reader transceiver circuit is configured to read a tag at very close range, including while being in contact with the tag. The transceiver can be coupled to various host devices in a variety of ways, including being located in a RFID reader (e.g., mobile or fixed position), a computing device, a barcode reader, etc. The transceiver can be located in an RFID module that is attachable to a host device, can be configured in the host device, or can be configured to communicate with the host device over a distance. The RFID module may include one or more antennas, such as a first antenna configured to receive a magnetic field component of an electromagnetic wave and a second antenna configured to receive an electric field component of an electromagnetic wave. The RFID module may include a detector that is configured to determine if the RFID module is positioned in proximity to an object, such as a RFID tag. The detector may operate as a trigger for the RFID module, to enable or trigger a function of the RFID module.

1 Claim, 14 Drawing Sheets

U.S. PATENT DOCUMENTS

| | | |
|---|---|---|
| 6,433,671 B1 | 8/2002 | Nysen |
| 6,531,957 B1 | 3/2003 | Nysen |
| 6,580,358 B1 | 6/2003 | Nysen |
| 6,950,009 B1 | 9/2005 | Nysen |
| 7,423,606 B2 | 9/2008 | Knadle et al. |
| 7,576,657 B2 | 8/2009 | Duron et al. |
| 2003/0174099 A1* | 9/2003 | Bauer et al. ............ 340/572.1 |
| 2005/0208915 A1 | 9/2005 | Fischer |
| 2005/0258940 A1 | 11/2005 | Quan |
| 2007/0008140 A1 | 1/2007 | Saarisalo et al. |

* cited by examiner

SINGLE FREQUENCY LOW POWER RFID DEVICE

The present application is a divisional application of U.S. application Ser. No. 11/529,733, filed Sep. 29, 2006, now U.S. Pat. No. 7,576,657 which claims the benefit of U.S. Appl. No. 60/784,450, filed Mar. 22, 2006, the contents of which are incorporated by reference herein in their entireties.

BACKGROUND OF THE INVENTION

1. Field of the Invention

The invention relates to radio frequency identification (RFID) technology, and in particular, to improved RFID readers.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

Current RFID systems suffer from various problems. For example, RFID readers suffer from high costs associated with programmable frequency synthesizers, power amplifiers, and high-speed high-resolution digitizers. However, these and other similar electronic devices are necessary to meet governmental regulatory requirements, such as FCC part 15.247, when designing high performance RFID systems.

Furthermore, if two or more tags and their associated boxes are present within the interrogation space, readers have difficulty distinguishing one tag from another within that interrogation space. For example, if two boxes and their associated tags were present, the interrogator would read the presence of both tags, but specifically determining which box was which is difficult unless one of the boxes is removed to be singulated.

Mobile readers have disadvantages. Readers require relatively large amounts of power to operate, which tends to limit battery life of mobile RFID terminals. Furthermore, readers produce excessive heat when housed in confined spaces such as mobile terminals. Still further, mobile RFID systems require large, bulky antennas to perform far field reads, to enable interrogation at long ranges.

RFID readers and tags are normally very susceptible to interference from other RFID readers in the general area. For example, reader transmissions normally interfere with other readers in the nearby general area. Readers transmitting at full power can even adversely affect the host system by which they are controlled and in which they are housed. When writing to RFID tags, the need for an interference free environment is paramount. Often this requires interference free zones to be configured, so that tags in the interference free zones can be reliably written.

Thus, what is needed are ways to improve a quality of communications between readers and tags in an RFID communications environment.

BRIEF SUMMARY OF THE INVENTION

Methods, systems, and apparatuses for improved RFID readers are described herein. In an aspect, a SAW oscillator is used to provide high frequency oscillating signals for a reader, enabling a very compact reader design. In another aspect, a near field antenna is used in a reader to enhance short range reads of tags. In a still further aspect, a reader circuit is mounted on a flexible substrate, to enable positioning of the reader circuit in a variety of locations.

In an aspect of the present invention, a radio frequency identification (RFID) reader transceiver is described. The transceiver includes a frequency generator, such as a surface acoustic wave (SAW) oscillator, an amplifier, a directional coupler, an antenna, and a demodulator. The frequency generator generates a radio frequency (RF) signal that is modulated with an input data stream, to generate a modulated RF signal. The amplifier receives the modulated RF signal and outputs an amplified modulated RF signal. The directional coupler has a first port that receives the amplified modulated RF signal. The antenna is coupled to a second port of the directional coupler. The demodulator is coupled to a reverse port of the directional coupler. The demodulator receives a tag response signal from the antenna through the directional coupler, and outputs a baseband signal.

In another aspect of the present invention, a method for a transceiver in a radio frequency identification (RFID) reader is described. An input data signal modulates a radio frequency (RF) oscillating signal generated by a frequency generator to generate a modulated RF signal. The modulated RF signal is amplified to generate an amplified modulated RF signal. The amplified modulated RF signal is transmitted. A tag response signal is received. The tag response signal is demodulated into a baseband signal.

In an aspect, the amplified modulated RF signal is radiated as a near field RF signal. In a further aspect, an antenna of the reader is contacted with a tag when transmitting the amplified modulated RF signal to the tag. In an alternative aspect, the an antenna of the reader is moved near, but not in contact with the tag, when transmitting the amplified modulated RF signal to the tag.

In aspect of the present invention, a RFID transceiver can be coupled to various host devices in a variety of ways, including being located in a RFID reader (e.g., mobile or fixed position), a computing device, a barcode reader, etc. The RFID transceiver can be located in an RFID module that is attachable to a host device, can be configured in the host device, or can be configured to communicate with the host device over a distance.

In an example aspect, a radio frequency identification (RFID) communication system includes a host computer and an RFID module coupled to the host computer. The RFID module includes a transceiver, a protocol processor configured to process RFID tag data, a host interface connector module configured to communicate RFID tag data with the computer, a plurality of antennas, and an antenna selector to couple an antenna of the plurality of antennas to the transceiver.

In a further aspect, the plurality of antennas includes a first antenna configured to receive a magnetic field component of an electromagnetic wave and a second antenna configured to receive an electric field component of an electromagnetic wave.

In another aspect, the plurality of antennas includes an antenna configured to be more efficient at radiating a communication signal into the near field region than into the far field region. For example, in an aspect, the antenna is a near field E-field coupling antenna, a near field H-field inductive coupling loop antenna, or a lossy transmission line.

In another aspect, an antenna is configurable to match properties of an antenna of a RFID tag proximate to the RFID module. For example, the antenna may be configured to be tuned by contacting the antenna with a RFID tag, such as due to a loading capacitance of the RFID tag.

In another aspect, a RFID module includes a detector that is configured to determine if the RFID module is positioned in proximity to an object, such as a RFID tag. The detector may operate as a trigger for the RFID module, to enable or trigger a function of the RFID module. For example, a transceiver of the RFID module may be enabled if the detector determines that the RFID module is positioned in proximity to a RFID tag.

For example, a RFID module may include first and second antennas, and a switch coupled to the first antenna and the second antenna. A detector is coupled to the switch. The switch is configured to enable one of the first antenna or the second antenna according to the detector.

In another example, a tuning module is configured to tune an antenna of the RFID module if a detector of the RFID module indicates that the antenna is proximate to an object.

In another example, the transceiver may perform communications using a substantially constant frequency or using frequency hopping, depending on whether the detector detects an object.

In example aspects, the detector may include a pressure sensor, a capacitive sensor, an optical sensor, an interrupter switch, a proximity sensor, and/or other type of sensor.

In another aspect, a RFID module includes a barcode reader interface. The barcode reader interface includes an interface circuit configured to exchange information with a host system. For instance, the barcode reader interface may be configured to transmit tag data to the host system in a signal format that emulates a signal format generated by a barcode reader.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
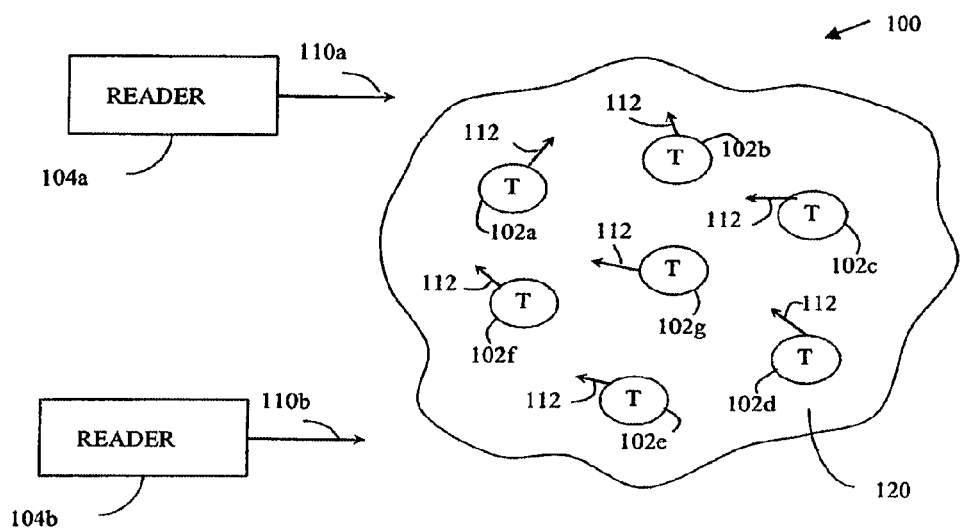
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID devices are described herein. In particular, methods, systems, and apparatuses for improved reader systems are described.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been allowed for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including EPC Class 0, Class 1, Gen 2, and other binary traversal protocols and slotted aloha protocols, any other protocols mentioned elsewhere herein, and future communication protocols.

Figure 2:
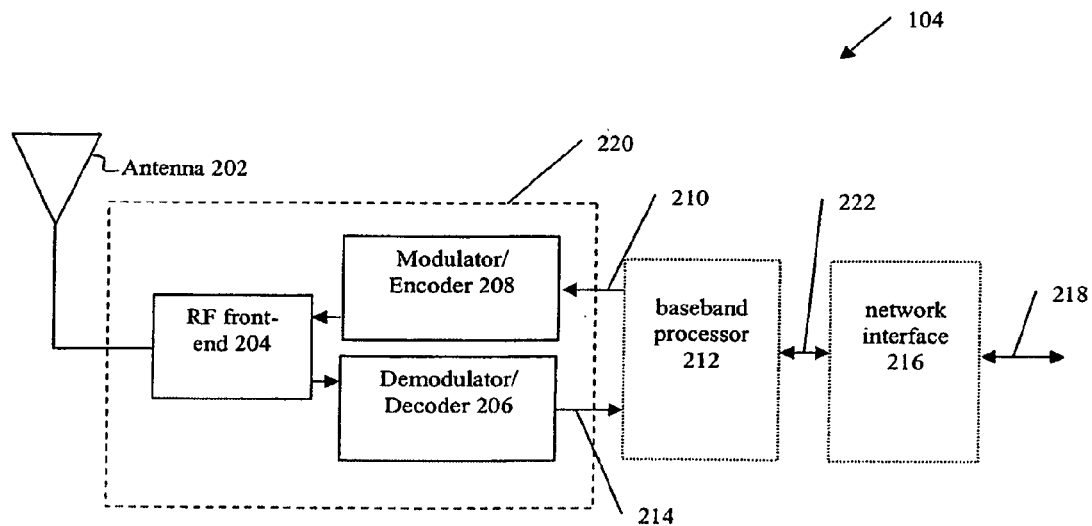
FIG. 2 shows a block diagram of receiver and transmitter portions of a RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104. As described further below, in an embodiment where a reader is contacted with a tag to be read by the reader, a pressure or capacitance sensor mounted on the antenna or the antenna housing may be used to trigger the reader.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
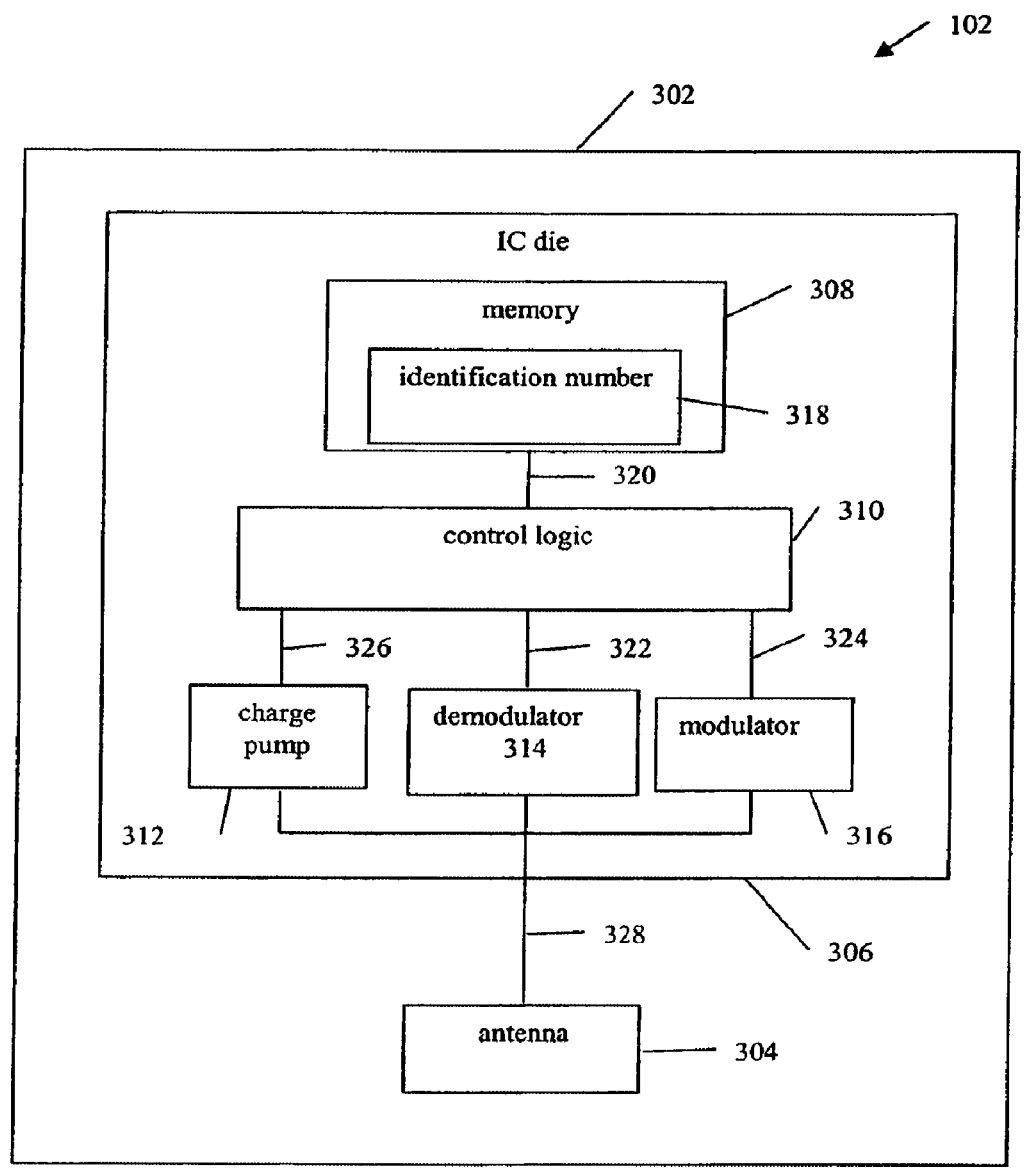
FIG. 3 shows a plan view of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item/container.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 is used to power circuits of IC die 306, including control logic 320.

Charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Embodiments of an improved RFID reader device are described in further detail below. Such embodiments have advantages over conventional readers. Such embodiments may interact with the tags described above, other tag types, and/or may be used in alternative environments. Furthermore, the embodiments described herein may be adapted and modified, as would be apparent to persons skilled in the relevant art(s).

Example Embodiments

Embodiments are described herein for improved readers. These embodiments can be implemented anywhere that readers and tags are used. For example, embodiments can be implemented in a commercial or industrial environment, such as in a warehouse, a factory, a business, or store, and in a military or other non-commercial environment.

In embodiment, transceivers are described that are suitable for RFID reader devices. The transceivers are very compact, and thus can be fit into small form factors. For example, in one embodiment, a transceiver is incorporated into a RFID module that is an attachable accessory for a host computer, such as a mobile handheld computer.

In embodiments, various types of oscillators can be used to generate a carrier frequency for the transceiver. In example transceivers described below, a surface acoustic wave (SAW) device is described as generating a carrier frequency for a transceiver, and in some embodiments also performs a modulating function. Such a SAW device can be formed in a small form factor, and thus enables a small form factor transceiver. Furthermore, a SAW device requires very low power to operate, and thus enables very low power operation for a transceiver. However, in alternative embodiments, other types of oscillator and modulator circuits may be used.

Figure 4:
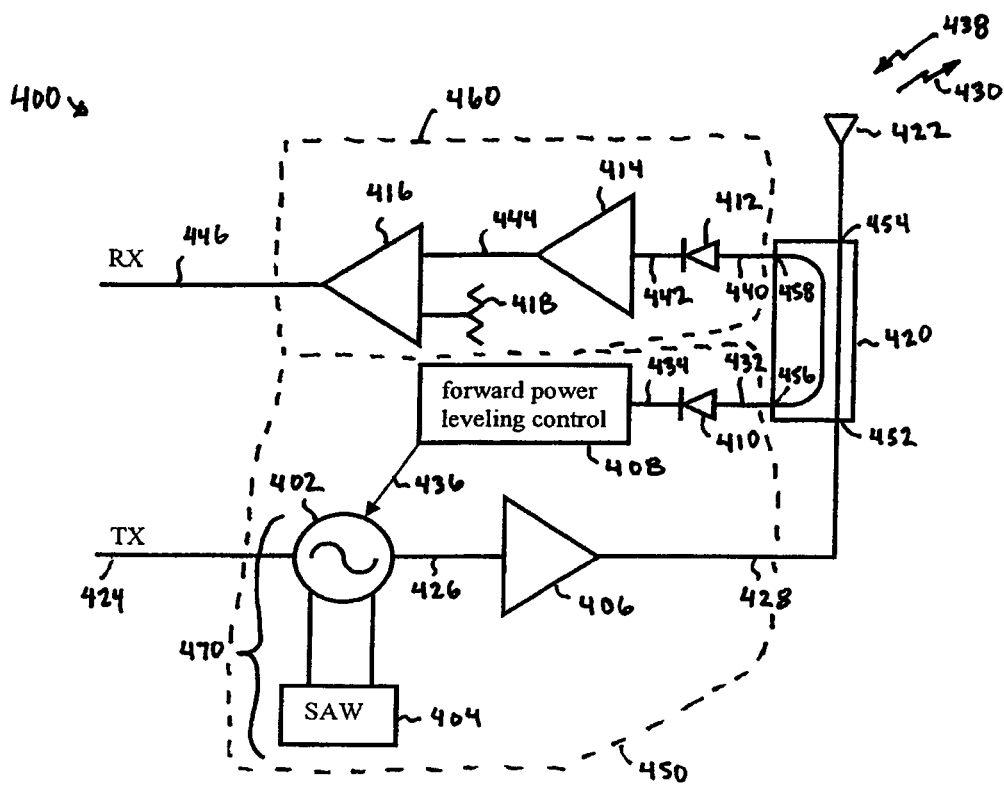
FIG. 4 shows an example reader transceiver circuit, according to an embodiment of the present invention.

FIG. 4 shows an example reader transceiver circuit 400, according to an embodiment of the present invention. As shown in FIG. 4, reader transceiver circuit 400 includes a transmitter portion 450, which includes an oscillator 402, a surface acoustic wave (SAW) device 404, an amplifier 406, a forward power leveling controller 408, and a first (forward coupled) diode 410. Reader transceiver circuit 400 further includes a receiver portion 460, which includes a second (reverse coupled) diode 412, an amplifier 414, a comparator 416, and a reference voltage source 418. Reader transceiver circuit 400 further includes a directional coupler 420 and an antenna 422, which are part of both the receiver and transmitter portions 450 and 460.

In the transmit side, as shown in FIG. 4, oscillator 402 and SAW device 404 form a SAW oscillator 470, as would be known to persons skilled in the relevant art(s). SAW oscillator 470 generates an oscillating signal that oscillates at a radio frequency. SAW oscillator 470 receives an input data signal 424, and amplitude modulates input data of input data signal 424 onto the radio frequency of the oscillating signal, to generate a modulated RF signal 426.

Amplifier 406 is a radio frequency amplifier. Modulated RF signal 426 is amplified by amplifier 406. Amplifier 406 outputs amplified modulated RF signal 428.

Directional coupler 420 may be a conventional directional coupler, as would be known to persons skilled in the relevant art(s). Directional coupler 420 has four ports (first-fourth ports 452, 454, 456, and 458). First and second ports 452 and 454 of directional coupler 420 are connected together by a through line of directional coupler 420. Third and fourth ports 456 and 458 of directional coupler 420 are connected together by a second signal line of directional coupler 420. Third and fourth ports 456 and 458 are directional ports. Fourth port 458 is a reverse port, coupling signals from second port 454 (at antenna 422). Third port 456 is a forward port, coupling signals from first port 452.

Amplified modulated RF signal 428 enters first port 452 of directional coupler 420, passing through directional coupler 420 to second port 454 of directional coupler 420. Antenna 422 is coupled to second port 454 of directional coupler 420. Antenna 422 radiates amplified modulated RF signal 428 as transmitted RF signal 430. Transmitted RF signal 430 is transmitted to communicate with tags, including to interrogate tags and provide tags with commands, and may also be used to provide energy to passive tags. Passive tags use the provided energy to power themselves (e.g., with a charge pump).

First diode 410 and forward power leveling controller 408 provide forward coupling, and form a feedback path used to monitor power output and maintain an amplitude of transmitted RF signal 430 at a desired level. An input of first diode 410 is coupled to third port 456 of directional coupler 420. First diode 410 converts a radio frequency carrier received on a signal 432 from third port 456 of directional coupler 420 to a DC level. A signal 434 output by first diode 410 is received by forward power leveling controller 408. In an example embodiment, forward power leveling controller 408 compares signal 434 against a standard level. In embodiments, forward power leveling controller 408 outputs a feedback error signal 436. Feedback error signal 436 is received at SAW oscillator 470, and is used to alter an amplitude of modulated RF signal 426 output by SAW oscillator 470.

On the receive side, antenna 422 receives a tag response signal 438 from a tag, that is modulated with tag response data. Tag response signal 438 enters second port 454 of directional coupler 420 from antenna 422. An input of second diode 412 is coupled to fourth port 458 of directional coupler 420. Second diode 412 receives a radio frequency carrier modulated with tag data received on a signal 440 from fourth port 458 of directional coupler 420, demodulates signal 440, and outputs a baseband signal 442. Baseband signal 442 includes tag response data.

Amplifier 414 is a baseband amplifier. Amplifier 414 amplifies baseband signal 442, and outputs an amplified baseband signal 444.

Comparator 416 receives amplified baseband, signal 444. Comparator 416 compares amplified baseband signal 444 with a reference signal output by reference voltage source 418, and outputs an output data signal 446. For example, comparator 416 may be used to more substantially "square" or "digitize" the waveform of amplified baseband signal 444. Output data signal 446 includes tag data, which may be further processed downstream from reader transceiver circuit 400.

Figure 5:
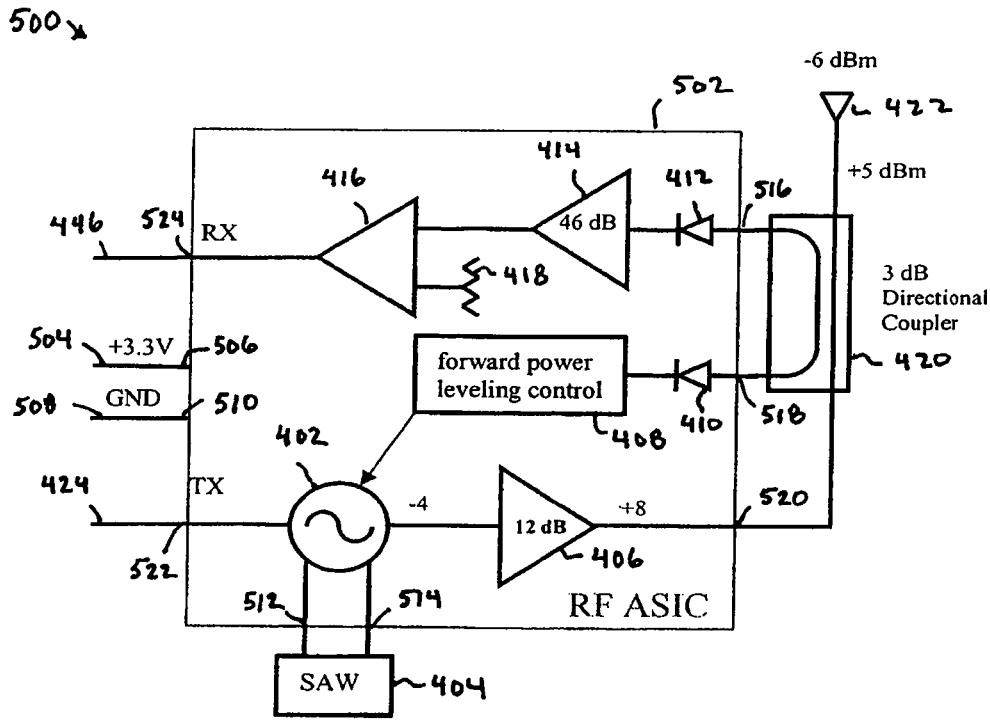
FIG. 5 shows a more detailed circuit diagram of the reader transceiver circuit of FIG. 4, including an application specific integrated circuit (ASIC), according to an example embodiment of the present invention.

The components of reader transceiver 400 may have various parameters and form factors, as desired for a particular application, as would be known to persons skilled in the relevant art(s). For example, FIG. 5 shows an example circuit chip implementation of the reader transceiver circuit of FIG. 4, according to an example embodiment of the present invention. FIG. 5 shows a reader transceiver circuit 500. In FIG. 5, oscillator 402, amplifier 406, forward power leveling controller 408, first diode 410, second diode 412, amplifier 414, comparator 416, and reference voltage source 418 are implemented in an integrated circuit (IC) 502, which may be an application specific integrated circuit (ASIC), for example. A power signal 504 (e.g., 3.3V or other suitable voltage) is received at a power port 506 of IC 502. A ground signal 508 is received at a ground port 510 of IC 502.

SAW device 404 is coupled between first and second ports 512 and 514 of IC 502, which couple SAW device 404 with oscillator 402. SAW device 404 may be any type of SAW resonant material, as would be known to persons skilled in the relevant art(s). For example, SAW device 404 may be a formed from a resonant material having any size, including a size less than a square centimeter. Oscillator 402 of IC 502 may be any type of oscillator circuit suitable for interfacing with a SAW resonator, as would be known to persons skilled in the relevant arts. For example, oscillator 402 may be a transistor based oscillator.

Directional coupler 420 is coupled to IC die 502 at first, second, and third ports 516, 518, and 520 of IC 502.

Data input signal 424 is received at a data input port 522 of IC 502. Data output signal 446 is output from data output port 524 of IC 502.

Reader transceiver circuits 400 or 500 can be incorporated in devices, mobile or stationary, to read tags in a near field fashion, such as in a "contact" or nearby fashion. For example, a reader device incorporating circuit 400 or 500 can be moved into contact with a tag (e.g., moving antenna 422 in contact with an antenna of the tag) to read the tag, or can be moved very close to the tag (e.g., within inches or feet) to read the tag. Such reader devices have many advantages.

Figure 6:
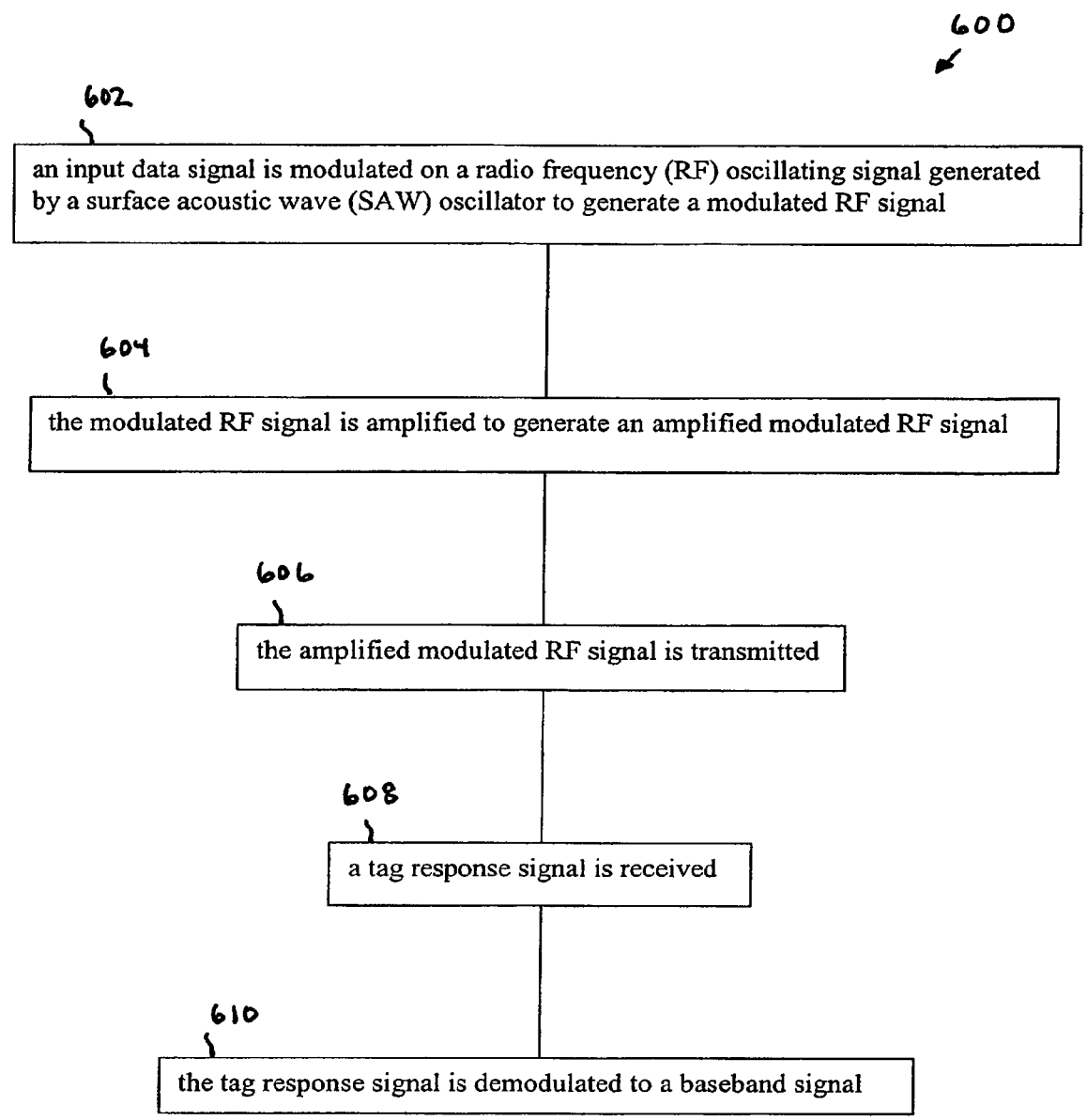
FIGS. 6 and 7 show example steps for a reader transceiver, according to embodiments of the present invention.

FIG. 6 shows a flowchart 600 providing example steps for operation of a reader transceiver, such as circuits 400 and 500, according to an embodiment of the present invention. Other structural and operational embodiments will be apparent to persons skilled in the relevant art(s) based on the following discussion.

Flowchart 600 begins with step 602. In step 602, an input data signal is modulated with a radio frequency (RF) oscillating signal generated by a surface acoustic wave (SAW) oscillator to generate a modulated RF signal. For example, in an embodiment, the SAW oscillator is SAW oscillator 470. SAW oscillator 470 generates a RF oscillating signal that is modulated with input data signal 424 to generate modulated RF signal 426.

In step 604, the modulated RF signal is amplified to generate an amplified modulated RF signal. For example, in an embodiment, as shown in FIG. 4, modulated RF signal 426 is amplified by amplifier 406 to generate amplified modulated RF signal 428.

In step 606, the amplified modulated RF signal is transmitted. For example, in an embodiment, as shown in FIG. 4, amplified modulated RF signal 428 is coupled to antenna 422 by directional coupler 420, and transmitted by antenna 422 as transmitted RF signal 430.

In step 608, a tag response signal is received. For example, as shown in FIG. 4, antenna 422 receives tag response signal 438.

In step 610, the tag response signal is demodulated to a baseband signal. For example, in an embodiment, as shown in FIG. 4, tag response signal 438 is coupled to diode 412 by directional coupler 420. Diode 412 demodulates tag response signal 438 to baseband signal 442. Alternatively, tag response signal 438 can be demodulated in ways other than by diode 412, including by a quadrature mixer and oscillator, power detector, and by other types of demodulators.

In an embodiment, step 606 can include the step of radiating the amplified modulated RF signal from a near field radiator element. For example, in an embodiment, antenna 422 can be a near field radiator element, such as a near field E-field coupling device or a near field inductive coupling loop.

In an embodiment, step 606 can further include contacting a tag with the near field radiator element. For example, antenna 422 can be actually contacted to a tag desired to be read, such as by contacting the antenna of the tag, when transmitting signal 428. Alternatively, antenna 422 can be moved near to the tag desired to be read when transmitting signal 428.

Figure 7:
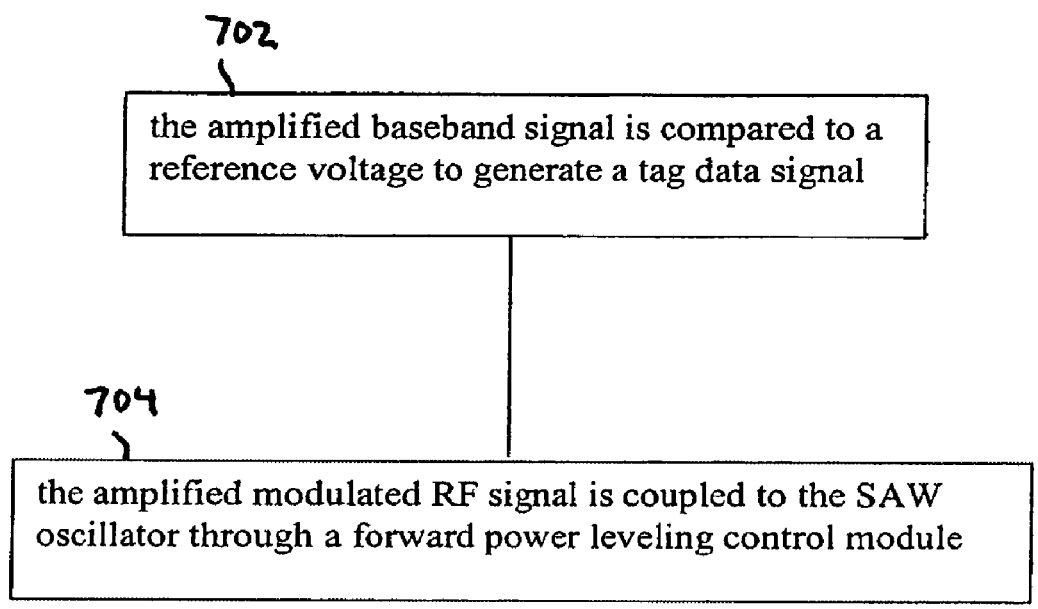

In embodiments, flowchart 600 can include further steps, such as shown in FIG. 7. For example, in an embodiment, flowchart 600 may further include step 702. In step 702, the amplified baseband signal is compared to a reference voltage to generate a tag data signal. For example, comparator 416 may be used to perform step 702, to digitize signal amplified baseband signal 444. Alternatively, signal 444 may be digitized in other ways, including by an A/D converter or a data slicer.

Flowchart 600 may include step 704. In step 704, the amplified modulated RF signal is coupled to the SAW oscillator through a forward power leveling control module. For example, in an embodiment, step 704 may be performed by forward power leveling control 408. Alternatively, other feedback mechanisms may be used to control output power.

Flowchart 600 may include further steps and/or alternative steps, as would be apparent to persons skilled in the relevant art(s) from the teachings herein.

In the example of FIG. 5, the effective radiated power (−6 dBi of the antenna driven multiplied by +5 dBm from the power amplifier) is 1 dBm. This is an EIRP (equivalent isotropically radiated power) level at which the FCC no longer requires frequency hopping per FCC 15.249(a) (50 mV/M). Thus, this implementation allows a very low cost, single frequency SAW oscillator to be used, eliminating an expensive synthesizer and crystal combination used in higher power conventional implementations. Additionally a high power (e.g., 1 Watt) amplifier required in conventional implementations is eliminated in the embodiments of FIGS. 4 and 5, due to the substantially lower RF power requirements of near field and contact interrogations of RFID tags.

Conventional RFID interrogators strive to interrogate the highest volume of space allowable by the FCC. This results in the largest amount of RFID tags being interrogated at one time as possible. However, this leads to an inherent difficulty in determining which tag is which among the interrogated tag population. By limiting the read range to contact only, or to contact and very short range (e.g, in the range of inches), the uncertainty of volumetric interrogations is eliminated.

By limiting the amount of power required to a level needed to interrogate tags at contact ranges, the amount of DC power required to generate the RF signals for near field contact reading are two to three orders of magnitude lower than that used in a far field high power volumetric interrogation. This results in a substantial energy savings when operating from battery powered sources. This further results in substantial reductions of generated heat when enclosed within a mobile handheld terminal.

By limiting an effective radiated power to an amount required to interrogate at contact ranges, the radiating antenna (e.g., antenna 422) can be made very small, with a corresponding reduction in antenna gain. This allows the antenna size to be reduced from a bulky 4" to 6" square patch or linear radiator to as little as a 0.7 inch square patch, or other small size. Such an antenna can act as a near field E-field coupling device, although it could also be a near field inductive coupling loop. This antenna has the tendency to radiate very little into the far field, but when placed in close proximity or contact with an RFID tag, will give up substantially more energy to the RFID tag through the near field coupling mechanism, enabling accurate reads. A traditional low gain reduced size far field antenna may also be employed. Either floating or ground reference antenna designs may be implemented.

By limiting an effective radiated power to an amount required to interrogate at only contact ranges, the radiating antenna can be made very small, with a corresponding reduction in antenna gain. This reduces the amount of RF susceptibility for the present reader to other interfering readers. Furthermore, this reduces the amount of RF interference that the present reader presents to other readers. Still further, any undesired interaction with other circuitry housed within the mobile terminal in minimized (when the present reader is housed in a mobile terminal).

In an embodiment, by placing the present reader in close proximity to an RFID tag being read, the tag being read becomes detuned by the presence of the present reader antenna. It therefore becomes much harder for an interfering reader to jam the interrogation and/or writing process of the present reader.

Figure 8:
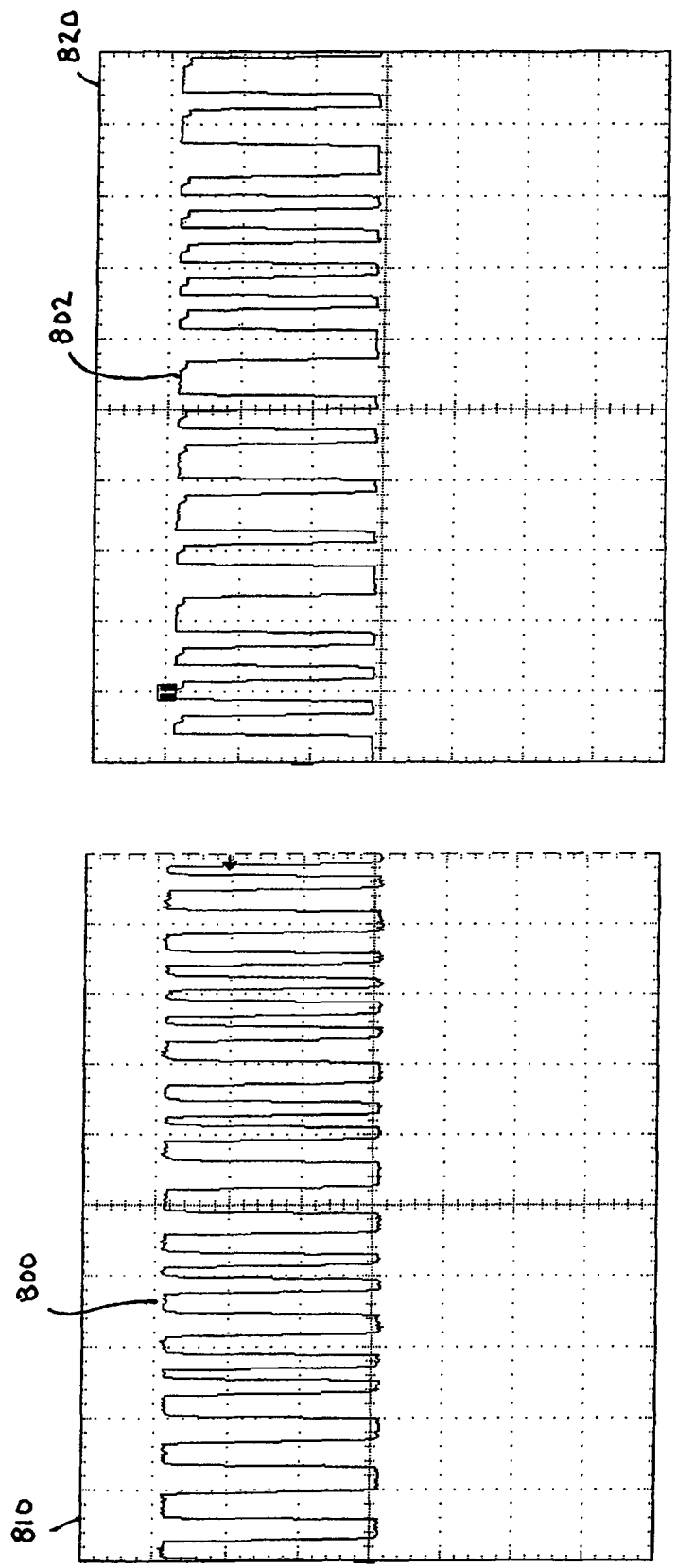
FIG. 8 shows output waveform signals for an example barcode scanner and an example reader transceiver circuit, according to an embodiment of the present invention.

FIG. 8 shows a first plot 810 of an output waveform signal 800 for an example reader transceiver circuit and a second plot 820 of an output waveform signal 802 for an example barcode scanner. For example, output waveform signal 800 may be output data signal 446 shown in FIG. 4, for a Class 1 tag or other tag type. Output waveform signal 802 may be a similar output data signal from a barcode scanner, such as data from a read Code 39 barcode, or other barcode type. As shown in FIG. 8, output waveform signals 800 and 802 are very similar in shape, and amplitude. Because of the substantial similarity of output waveform signals 800 and 802, output waveform signals 800 and 802 can be received and processed by the same signal processing circuit. Thus, reader transceiver circuits 400 and 500 can be incorporated in existing barcode scanner devices, including mobile barcode scanners, with the pre-existing components of the barcode scanner devices that process scanned barcode data being used to process tag data, with little or no modification. Thus, embodiments of the present invention can easily be integrated into barcode scanners.

Communication ranges for conventional RFID readers vary. For example, one conventional reader that is a long range mobile reader may have a range between 0-10 feet. Another conventional reader that is a mid-range mobile reader, may have a range between 0-4 feet. In an embodiment, a reader that is a short range mobile reader may have a range of 0-3 inches, although, other ranges are also possible, depending on the particular implementation.

In an example embodiment, a reader including features described above may be configured as a limited functionality reader, although this is not required. The reader may be configured for short range, to read a single tag at a time, and thus does not suffer from environments containing multiple readers. The reader may use analog signal processing that leverages a barcode reader's baseband circuitry.

In an embodiment, a reader as described herein can be made at very low cost (e.g., <$20 in parts) and can operate at low power (e.g., 100 ma @ 5V peak). This is because of the very low range and very power efficient components utilized by the readers described herein, such as a SAW oscillator, lower power amplifiers, etc. Furthermore, the lower broadcast power enables passing FCC requirements without the need for frequency hopping, high power RF, and expensive spectral mask controls.

Still further, as described above, the present reader may be configured to share scanner electronics, and thus can be easily incorporated into scanner devices, such as bar code scanners and other machine readable symbol scanner devices.

Figure 12:
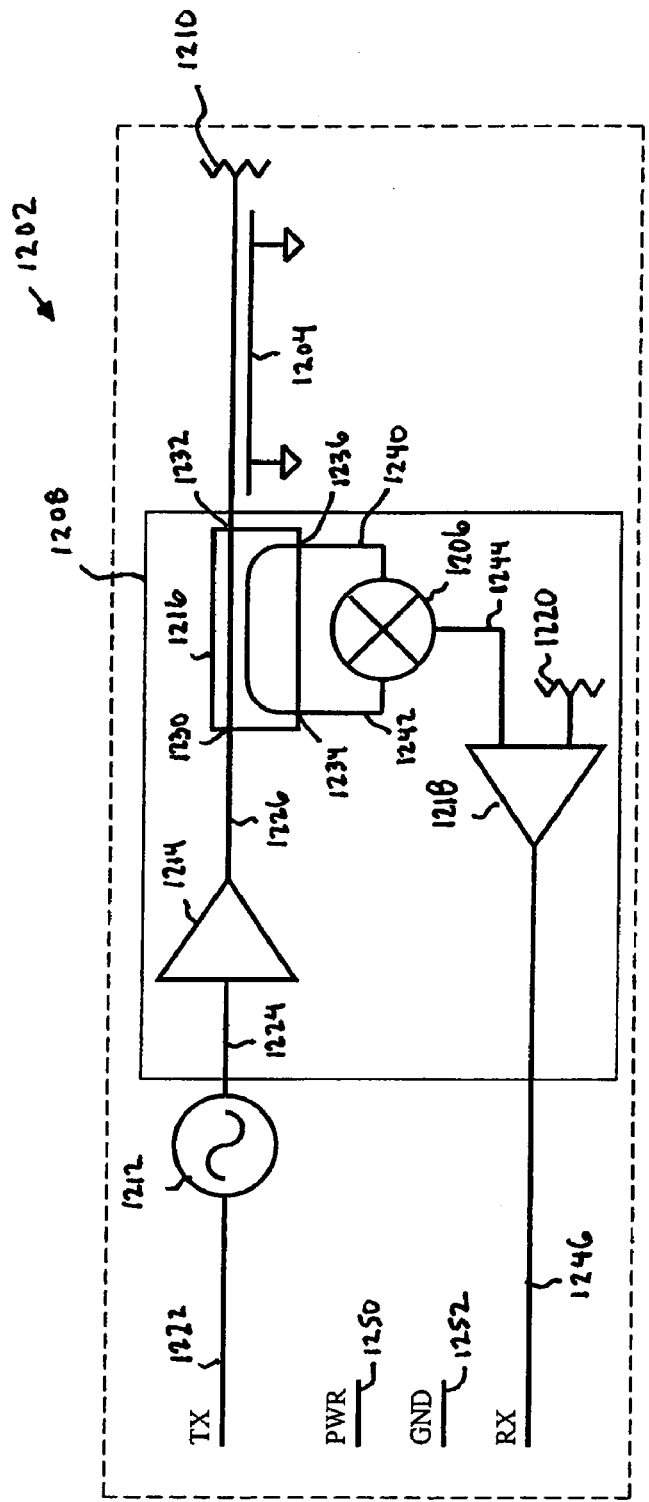
FIG. 12 shows an example reader transceiver circuit, according to an embodiment of the present invention.

In an embodiment, the present reader is configured to use a "near-field" antenna configuration, such as described above, or including patch, linear, or loop antenna configuration. Another near-field antenna example is a lossy transmission line type antenna (such as shown in FIG. 12). The lossy line antenna is a printed circuit transmission line that is terminated into the characteristic impedance of the transmission line. When nothing disturbs the transmission line, it contains nearly all RF energy within the printed structures, and terminates all energy into the load at the end of the transmission line. In this non-disturbed mode, the lossy transmission line radiates very little energy into the far field. Thereby allowing a stronger drive level to be injected into the transmission line.

When a disturbing element is brought within the near field of the lossy transmission line, the characteristic impedance is changed which causes the transmission line to give up RF energy to the disturbing element, i.e. the RFID tag being interrogated.

Because of the mainly near-field characteristics in reader embodiments, single RFID tags can be read, which is very difficult with long-range handheld type readers in the presence of more then one RFID tag.

Furthermore, due to the shorter range of transmitted signals, there is less portal interference. For example, an embodiment may have an interference range of a few meters, while a conventional reader may have an interference range as much as a mile or more.

In an embodiment, signal processing is performed in the reader. In another embodiment, signal processing can be performed in a host rather than in a mobile reader. For example, packet processing and protocol can be handled on a host processor (e.g., much like an undecoded Scan Engine). Furthermore, digital (DBP—digital bar pattern) or analog (e.g., SURF technology) interfaces are enabled.

Figure 9:
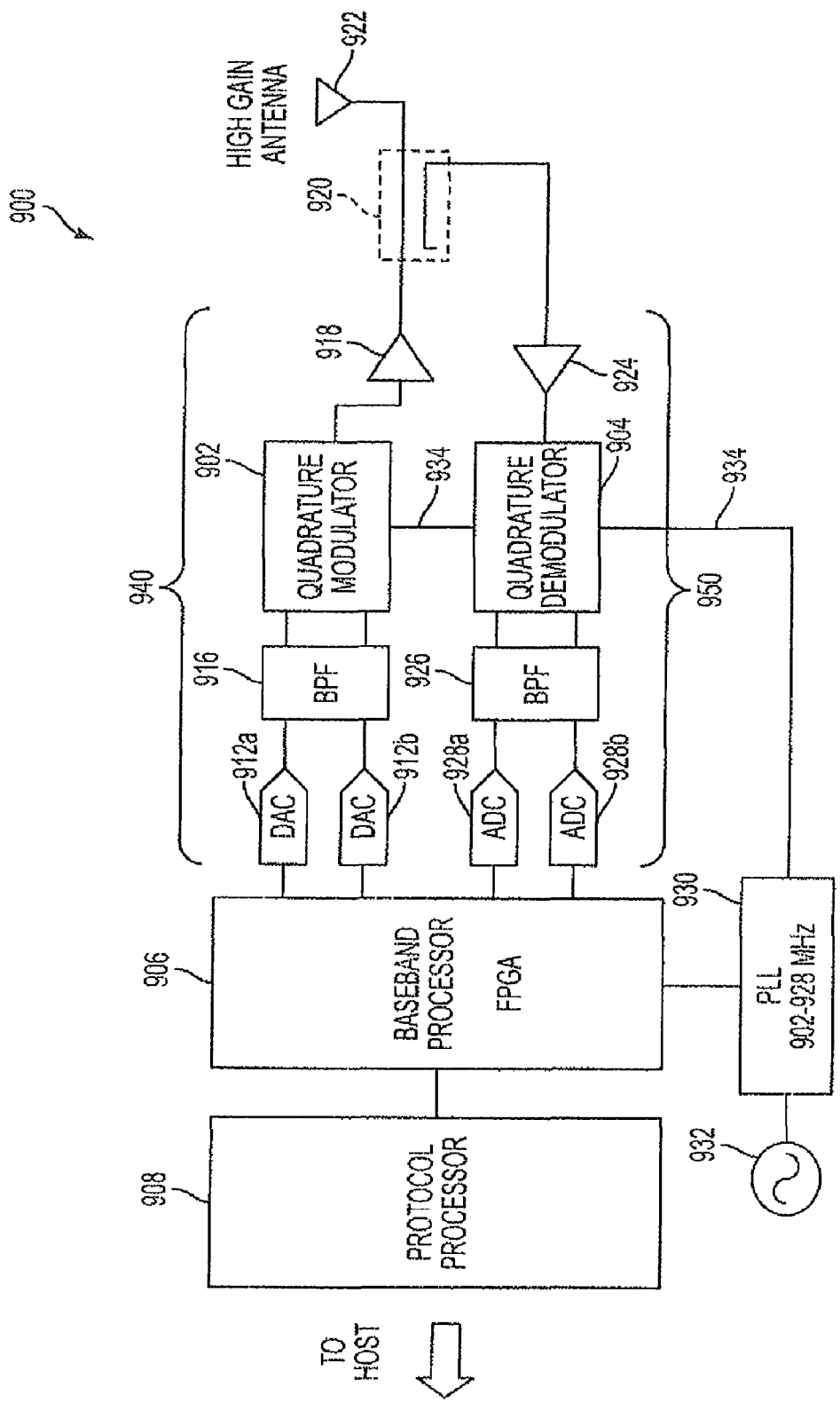
FIG. 9 shows a block diagram of a conventional RFID reader.

FIG. 9 shows a block diagram of a conventional RFID reader 900. Reader 900 is similar to reader 104 of FIG. 2, with some modifications. For example, a quadrature modulator 902 is shown for modulator/encoder 208, and a quadrature demodulator 904 is shown for demodulator/decoder 206. Furthermore, baseband processor 212 is shown as an FPGA (field programmable gate array)-based baseband processor 906. A protocol processor 908 is coupled to baseband processor 906 for protocol-level processing. Protocol processor 908 is further coupled to a host, which may be a remote computer system, etc., by a wired or wireless link 910.

In a transmitter portion 940 of reader 900, a pair of digital-to-analog converters (DACs) 912a and 912b receive first and second input data signals from baseband processor 906. The first and second input data signals contain information to be transmitted by reader 900, such as in an interrogation signal. DACs 912a and 912b output first and second analog signals. The analog signals are filtered by band pass filter (BPF) 916, which outputs first and second filtered analog signals that are received by quadrature modulator 902. Quadrature modulator 902 modulates the first and second filtered analog signals in a quadrature manner with an oscillating signal 934, to output a modulated signal, which is amplified by amplifier 918. The amplified modulated signal is passed through directional coupler 920 to antenna 922, which is typically a high-gain antenna.

In a receiver portion 950 of reader 900, antenna 922 receives a signal (e.g., from one or more tags). Directional coupler 920 couples the received signal from antenna 922 to an amplifier 924. Amplifier 924 amplifies the received signal, and outputs an amplified received signal. The amplified received signal is received by quadrature demodulator 904, which demodulates the amplified received signal according to oscillating signal 934, and outputs first and second demodulated signals. The first and second demodulated signals are filtered by a BPF 926, and first and second filtered demodulated signal output by BPF 926 are received by a pair of digital converters (ADCs) 928a and 928b. ADCs 928a and 928b convert the first and second filtered demodulated signals to digital form, outputting first and second digital signals that are received by baseband processor 906.

A phase lock loop (PLL) 930 is coupled to an output of an oscillator 932 to generate an oscillating signal 934, which may contain a range of radio frequencies used by quadrature modulator and demodulator 902 and 904, and by baseband processor 906.

Figure 10:
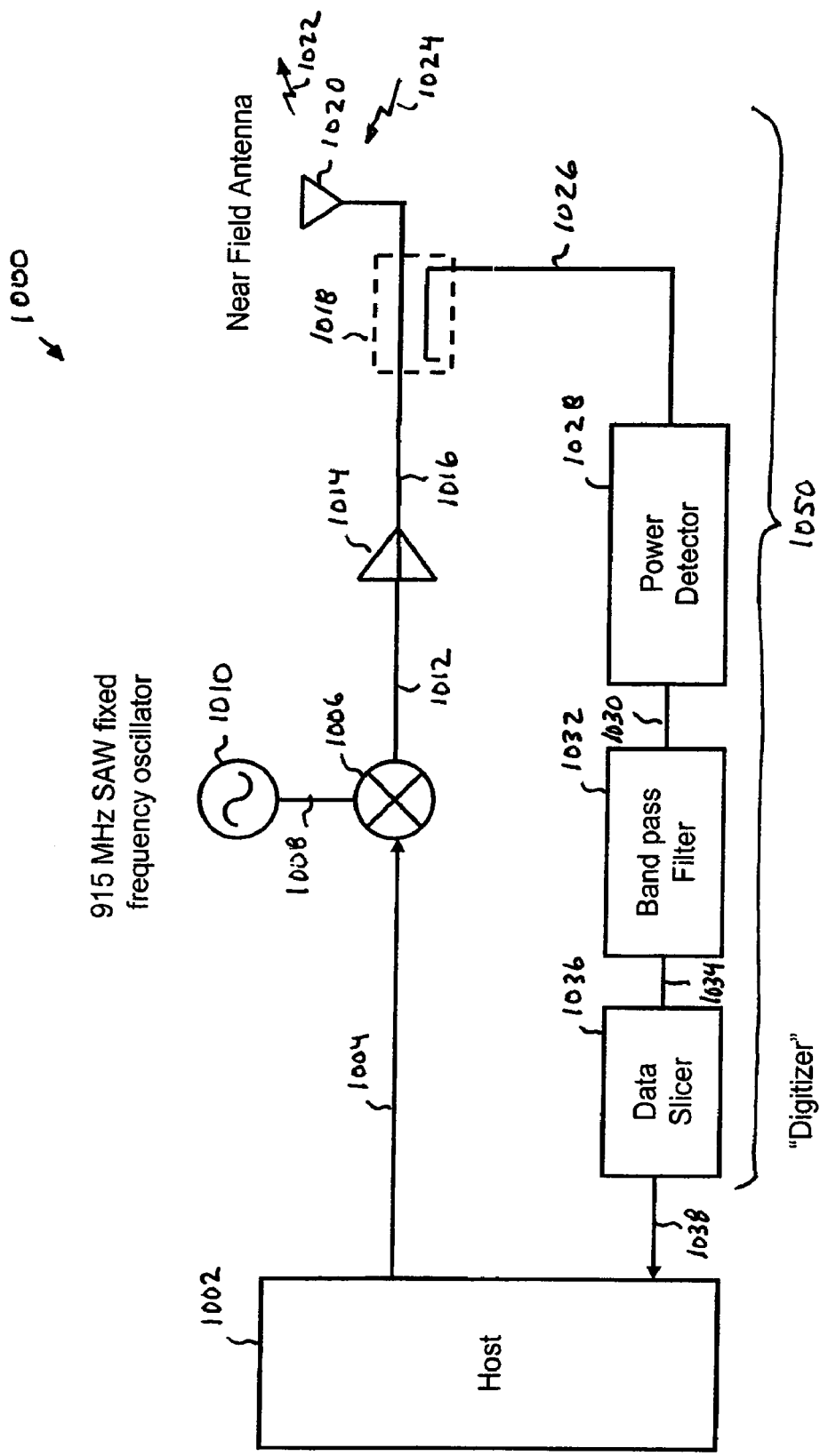
FIG. 10 shows a block diagram of an example RFID reader, according to an embodiment of the present invention.

FIG. 10 shows a block diagram of an example RFID reader 1000, according to an embodiment of the present invention. The architecture of RFID reader 1000 is simpler and requires fewer components than conventional reader 900 of FIG. 9. A host 1002 is coupled to a reader transceiver circuit 1050. Host 1002, which may be a computer system, for example, may be internal or external to reader 1000. Reader transceiver circuit 1050 includes a SAW oscillator 1010, an amplifier 1014, a directional coupler 1018, an antenna 1020, a power detector 1028, a band pass filter (BPF) and baseband amplifier 1032, and a data slicer 1036.

In the embodiment of FIG. 10, host 1002 outputs an input data signal 1004. Input data signal 1004 is received by the SAW oscillator 1010. SAW oscillator 1010 amplitude modulates a generated RF oscillation, and outputs a modulated radio frequency (RF) signal 1012. Modulated RF signal 1012 is received by amplifier 1014, which outputs an amplified modulated RF signal 1016. Directional coupler 1018 receives amplified modulated RF signal 1016, and outputs amplified modulated RF signal 1016 to antenna 1020. Antenna 1020 transmits RF transmitted signal 1022.

Antenna 1020 receives tag response signal 1024, which is coupled onto a signal 1026 by directional coupler 1018. Signal 1026 is a modulated RF signal. Power detector 1028 receives signal 1026, and outputs a baseband signal 1030. Baseband signal 1030 of power detector 1028 is received by BPF 1032. BPF 1032 outputs filtered baseband signal 1034. Data slicer 1036 receives filtered baseband signal 1034, and outputs an output data signal 1038. Host 1002 receives output data signal 1038.

As is apparent by comparing readers 900 and 1000 of FIGS. 9 and 10, reader 900 is a simpler architecture than that of reader 1000. Furthermore, reader 900 can be implemented in a much smaller form factor, requires fewer components, less power, and has further benefits. For example, instead of the complex PLL 930 and oscillator 932 combination as used in reader 900, reader 1000 uses a fixed frequency SAW oscillator 1010. Furthermore, antenna 1020 is a near field or far field antenna, as opposed to antenna 922, which is typically a high gain far field antenna. Thus, antenna 1020 enables near field reads of tags, with reduced interference.

Figure 11A:
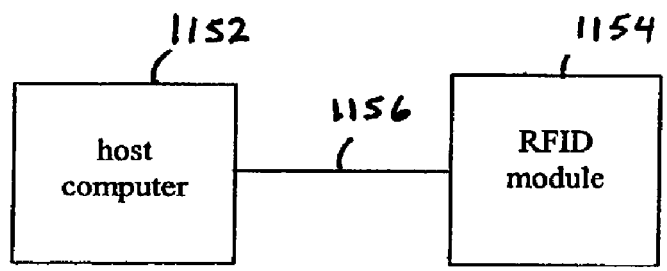
FIGS. 11A and 11B show a block diagram of a host computer coupled to a RFID module, according to an example embodiment of the present invention.

Thus, as shown in FIG. 10, transceiver embodiments of the present invention may be interfaced with a host, such as a host computer, to receive input data signals from the host for transmission, and to output received data signals to the host. Transceiver embodiments of the present invention may be incorporated in RFID modules that interface with hosts. For example, FIG. 11A shows a host computer 1152 that is coupled to an RFID module 1154 by a communication link 1156. Communication link 1156 may be a wired link (e.g., a cable) or a wireless link (e.g., BLUETOOTH or 802.11).

Figure 11B:
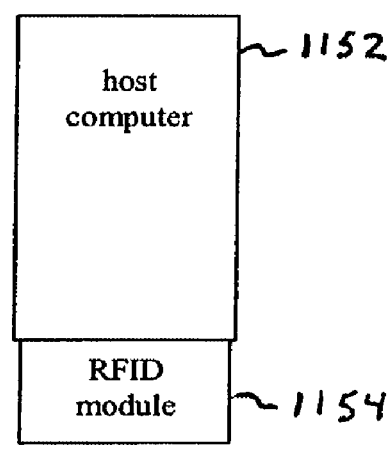

Host computer 1152 and RFID module 1154 may be coupled together over a distance or may be directly coupled to each other. For example, FIG. 11B shows RFID module 1154 attached to host computer 1152 as an attachable accessory. In the example of FIG. 11B, host computer 1152 is contained in a first housing, and RFID module 1154 is contained in a second housing. The first and second housings are attached to each other, and exchange signals through communication link 1156. The first and second housings may be attached by coupling mechanisms, mounts, etc., as would be known to persons skilled in the relevant art(s). In an embodiment, host computer 1152 may be a hand-carried, mobile device. In such an embodiment, RFID module 1154 may provide RFID functionality to host computer 1152. Examples of mobile versions of host computer 1152 include a laptop computer, a personal digital assistant (PDA), a BLACKBERRY or TREO device, a barcode reader, a cell phone, or other handheld device.

Figure 11C:
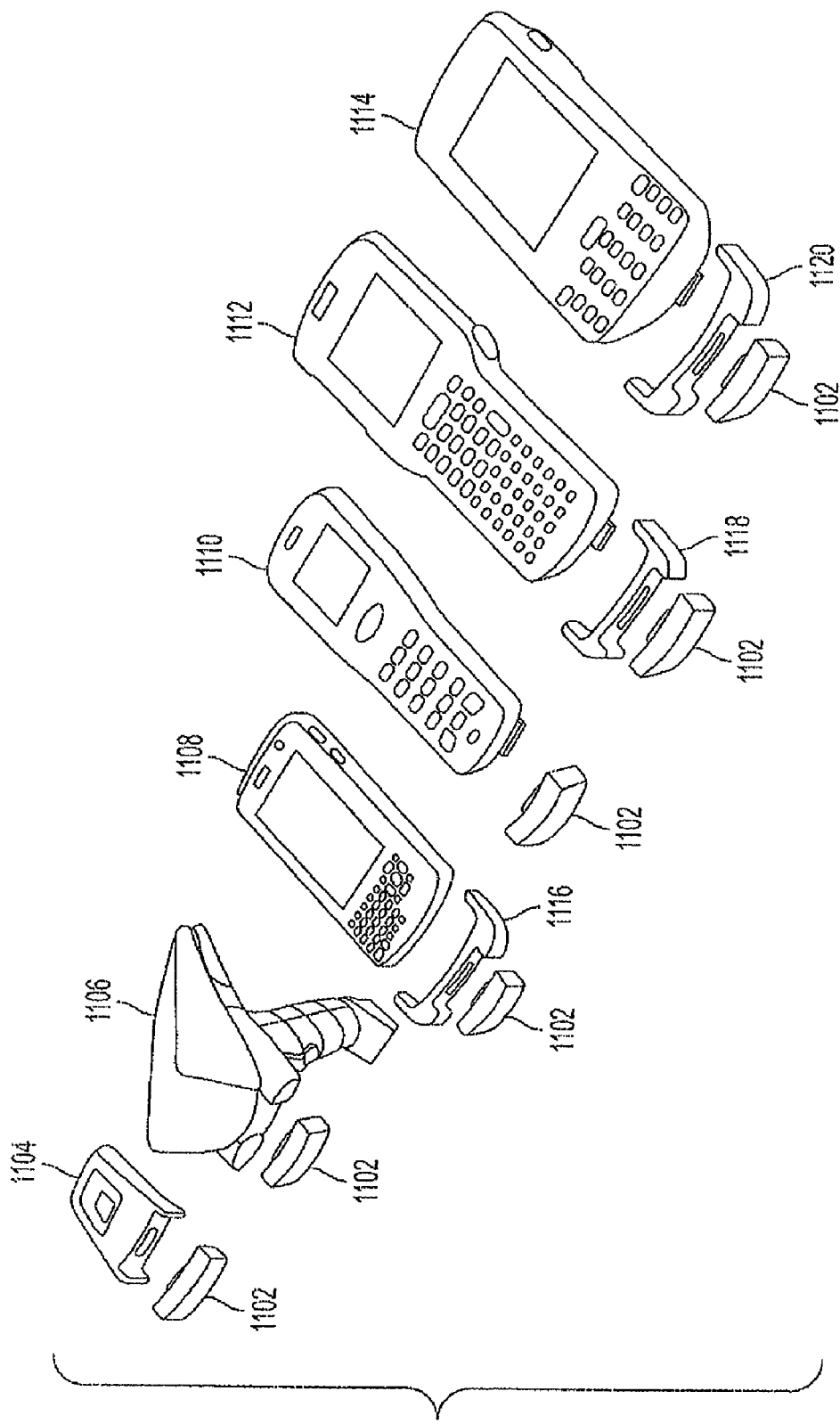
FIG. 11C shows example embodiments of the present invention as attachable accessories for example mobile handheld devices.

FIG. 11C shows example embodiments of the present invention as attachable RFID accessories, for example mobile handheld devices. The small form factor enabled by embodiments of the present invention allow the implementation of embodiments as attachable accessories. For example, FIG. 11C shows a reader transceiver module 1102 as a RFID module that is attachable to each of several mobile devices. The mobile devices shown are a universal wireless handheld device 1104, an NG phaser device 1106, an MC50 enterprise digital assistant 1108, an MC1000 handheld computer 1110, an MC3000 mobile computer 1112, and an MC70 enterprise digital assistant 1114, each distributed by Symbol Technologies, Inc., of Holtsville, N.Y.

Reader transceiver module 1102 is a housing that encloses a reader transceiver circuit, such as one of circuits 400, 500, or 1050. The housing of reader transceiver module 1102 is configured to be attachable to a mobile device at an interface of the mobile device, such as an option port. For example, the housing of reader transceiver module 1102 connects directly into a recessed port of device 1104, device 1106, and handheld computer 1110. The housing of reader transceiver module 1102 attaches to digital assistant 1108, mobile computer 1112, and digital assistant 1114 via interface modules 1116, 1118, and 1120, respectively. Interface modules 1116, 1118, and 1120 have housings that each have a recessed first port for attaching the housing of reader transceiver module 1102, and a second port that conforms to the respective mobile device (e.g., to an interface of the mobile device). Thus, in each case, reader transceiver module 1102 can be attached to each mobile device in a conforming manner for better form factor.

FIG. 12 shows an example reader transceiver circuit 1202, according to an embodiment of the present invention. Reader transceiver circuit 1202 is shown as an ASIC 1208, and is similar to reader transceiver circuit 400 of FIG. 4, except that a lossy transmission line 1204, which may be a ship line on a flex substrate, is used as an antenna. Furthermore, a transmit side feedback loop is not present, and a mixer 1206 is used on the receive side to remove a radio frequency carrier from a received tag response signal (instead of a diode such as diode 412 shown in FIG. 4).

Radio transceiver circuit 1202 includes ASIC 1208, a SAW device 1212, lossy transmission line 1204, and a termination 1210. ASIC 1208 includes mixer 1206, an amplifier 1214, a directional coupler 1216, a comparator 1218, and a reference voltage source 1220. A power signal 1250 (e.g., 3.3V or other suitable voltage) is received at a power port of ASIC 1208. A ground signal 1252 is received at a ground port of ASIC 1208.

In the transmit side, as shown in FIG. 12, SAW device 1212 receives an input data signal 1222, and amplitude modulates input data of input data signal 1222 onto a radio frequency oscillating signal, to generate a modulated RF signal 1224.

Amplifier 1214 is a radio frequency amplifier. Modulated RF signal 1224 is amplified by amplifier 1214. Amplifier 1214 outputs amplified modulated RF signal 1226.

Directional coupler 1216 has four ports (first-fourth ports 1230, 1232, 1234, and 1236). First, and second ports 1230 and 1232 of directional coupler 1216 are connected together by a through line of directional coupler 1216. Third and fourth ports 1234 and 1236 of directional coupler 1216 are connected together by a second signal line of directional coupler 1216. Third and fourth ports 1234 and 1236 are directional ports. Fourth port 1236 is a reverse port, viewing signals from second port 1232. Third port 1234 is a forward port, viewing signals from first port 1230.

Amplified modulated RF signal 1226 enters first port 1230 of directional coupler 1216, passing through directional coupler 1216 to second, port 1232 of directional coupler 1226. A first end of lossy transmission line 1204 is coupled to second port 1232 of directional coupler 1216. A second end of lossy transmission line 1204 is coupled to termination 1210. Lossy transmission line 1204 normally radiates very little energy until it is disturbed by a conductor or dielectric in close proximity, as in the case of a RFID tag in close proximity. It then gives up energy, by radiating amplified modulated RF signal 1226 as a transmitted RF signal to communicate with tags, including to interrogate tags and provide tags with commands, and may also be used to provide energy tags. Tags use the provided energy to power the tags (e.g., with a charge pump). Transmission line 1204 is an efficient radiator in the near field region.

On the receive side, lossy transmission line 1204 receives a tag response signal from a tag, that is modulated with tag response data. The tag response signal enters second port 1232 of directional coupler 1216 from lossy transmission line 1204. Mixer 1206 is coupled between third and fourth ports 1234 and 1236 of directional coupler 1216. Mixer 1206 mixes a radio frequency carrier modulated with tag data received on a signal 1240 from fourth port 1236 (coupled from second port 1232) of directional coupler 1216, with an RF oscillating signal 1242 from third port 1234 (coupled from first port 1230), to demodulate signal 1240, and outputs a baseband signal 1244. Baseband signal 1244 includes tag response data.

Comparator 1218 receives baseband signal 1244. Comparator 1218 compares baseband signal 1244 with a reference signal output by reference voltage source 1220, and outputs an output data signal 1246. For example, comparator 1218 may be used to more substantially "square" the waveform of baseband signal 1244. Output data signal 1246 includes tag data, which may be further processed downstream from reader transceiver circuit 1202.

Elements of reader transceiver circuit 1202 can have a variety of parameter values. For instance, in an example embodiment, SAW oscillator 1212 may generate a 915 MHz fixed oscillating frequency. Amplifier 1214 may have a 16 dB gain. Directional coupler 1216 may be a 16 dB coupler. These parameter values are provided for illustrative purposes, and are not intended to be limiting.

Figure 13:
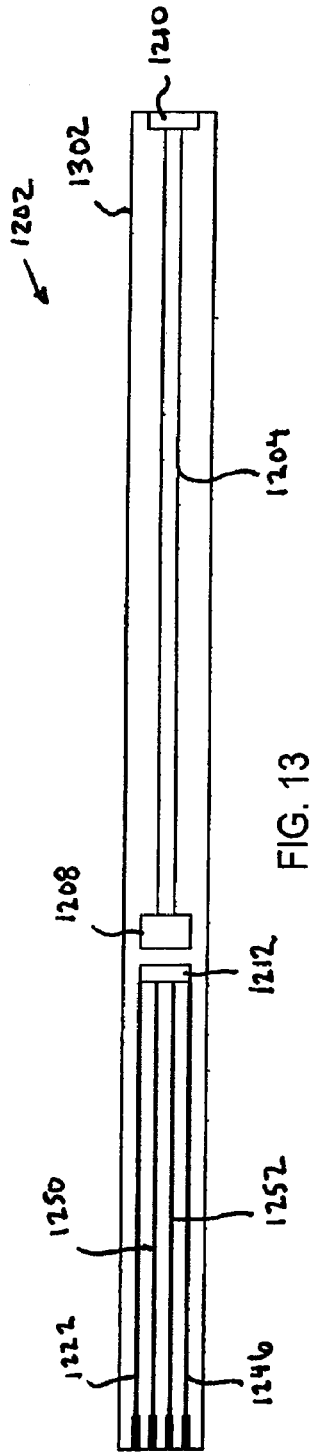
FIG. 13 shows the reader transceiver circuit of FIG. 12 on a flexible substrate, according to embodiment of the present invention.

FIG. 13 shows a flexible substrate 1302 that may be used to mount reader transceiver circuit 1202. Flexible substrate 1302 is made from a flexible material, such as a plastic, polymer, or other substrate material that flexes. Because substrate 1302 flexes, and can thus be shaped, flexible substrate 1302 enables circuit 1202 to be positioned in and on objects, such as mobile devices, in a variety of configurations. Furthermore, flexible substrate 1302 may have an adhesive backing, so that radio transceiver circuit 1202 can be easily attached to an outside surface or an inside surface.

Embodiments of the present invention may be implemented in a variety of apparatuses and form factors. For example, reader transceiver circuits, such as circuits 400, 500, 1050, and 1202 can be implemented in a variety of devices to provide reader functionality. For example, reader transceiver circuits can be implemented in a mobile reader, a stationary readers, a watch, a glove, a URA device, a phone (e.g., a cell phone), and a wearable mobile device. Furthermore, the reader transceiver circuits described above, including circuits 400, 500, 1050, and 1202, can be combined in any manner.

Example System Embodiments

As described above, embodiments of the present invention can be implemented in many forms, including in RFID readers, in attachable RFID module accessories, in barcode readers, in mobile devices, and in other devices. Some further example system implementations are described below. These embodiments may be adapted, modified, and combined in any manner, as would be apparent to persons skilled in the relevant art(s).

Figure 14:
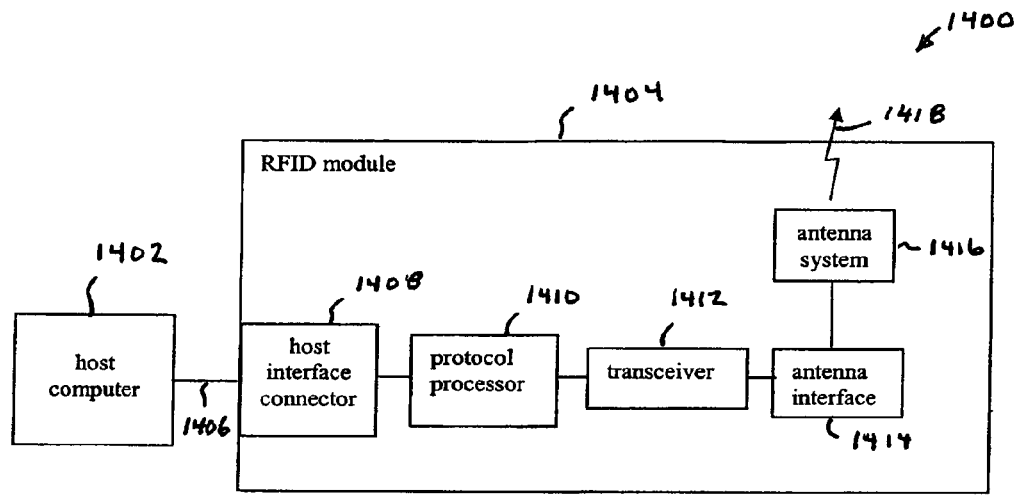
FIGS. 14-19 show example RFID communication systems, according to embodiments of the present invention.

For instance, FIG. 14 shows a RFID communication system 1400, according to an example embodiment of the present invention. As shown in FIG. 14, system 1400 includes a host computer 1402 and a RFID module 1404. RFID module 1404 includes RFID functionality for communicating with RFID tags. RFID module 1404 may be implemented in a reader, in an RFID module, or other device. Host computer 1402 may be computer system, similar to host 1002 described above. Host computer 1402 may be implemented in a desktop computer, server, mobile handheld computer (e.g., a PDA), a barcode scanner (e.g., handheld), a cell phone, or other device described elsewhere herein or otherwise known.

Host computer 1402 and RFID module 1404 communicate over communication link 1406. Communication link 1406 may be a wired link (e.g., a cable) or a wireless link (e.g., BLUETOOTH or 802.11), similar to communication link 1156 described above, for example. Similarly to host computer 1152 and RFID module 1154 described above with respect to FIG. 11, host computer 1402 and RFID module 1404 may be coupled directly together (e.g., RFID module 1404 may be an attachable accessory) or may be devices that operate separately and communicate over a distance.

As shown in the embodiment of FIG. 14, RFID module 1404 includes a host interface connector 1408, protocol processor 1410, transceiver 1412, an antenna interface 1414, and an antenna system 1416. Host interface connector 1408 is configured to enable RFID module 1404 to exchange data with host computer 1402 over communication link 1406. Host interface connector 1408 may be configured to exchange data according to any suitable protocol, proprietary or industry standard, including those described elsewhere herein, or otherwise known. In an embodiment, host interface connector 1408 may be configured similarly to network interface 216 described above with respect to FIG. 2. Host interface connector 1408 may include hardware (e.g., electrical circuits), software, firmware, or any combination thereof, to perform its functions.

Protocol processor 1410 is configured to perform protocol level processing for data received from host interface connector 1408 to be provided to transceiver 1412, and for tag data received from transceiver 1412. For example, protocol processor 1410 may provide processing (such as formatting) of data according to RFID protocols such as EPC Class 0, Class 1, Gen 2, etc. Protocol processor 1410 may include hardware, software, firmware, or any combination thereof, to perform its functions.

Transceiver 1412 receives a data signal from protocol processor 1410, modulates a carrier frequency with the data signal, and provides the modulated signal to antenna system 1416 through antenna interface 1414. Transceiver 1412 further receives a tag response signal from antenna system 1416 through antenna interface 1414, demodulates the tag response signal, and provides the demodulated signal to protocol processor 1410. In embodiments, transceiver 1412 can be configured according to any of the transceivers described herein, including being configured similarly to circuits 400, 500, 1050, and 1202, and including any combination of modifications of the same.

Antenna interface 1414 provides a signal interface between antenna system 1416 and transceiver 1412. For example, in an embodiment, antenna interface 1414 includes a cable, such as a coaxial cable, and/or one or more transmission lines. In further embodiments, such as described in more detail below, antenna interface 1414 may include further functionality, such as providing an antenna selection function when more than one antenna is present in antenna system 1416.

Antenna system 1416 includes one or more antennas for transmitting RF communications signals, such as RF communication signal 1418, and for receiving RF communications signals. For example, RF communication signal 1418 may be a tag read or interrogation signal. Received RF communication signals may be tag responses, for example.

Antenna system 1416 can include any of a variety of types of antenna, including those described elsewhere herein or otherwise known. For example, in an embodiment, antenna system 1416 may include a magnetic field ("H-field") sensitive antenna type (e.g., a loop antenna), an electric field ("E-field") sensitive antenna type (e.g., a dipole antenna), and/or antennas configured to be more sensitive in the near field region (e.g., a patch, a near field E-field coupling device, a near field H-field inductive coupling loop, a lossy transmission line, etc.) or far field region.

Figure 15:
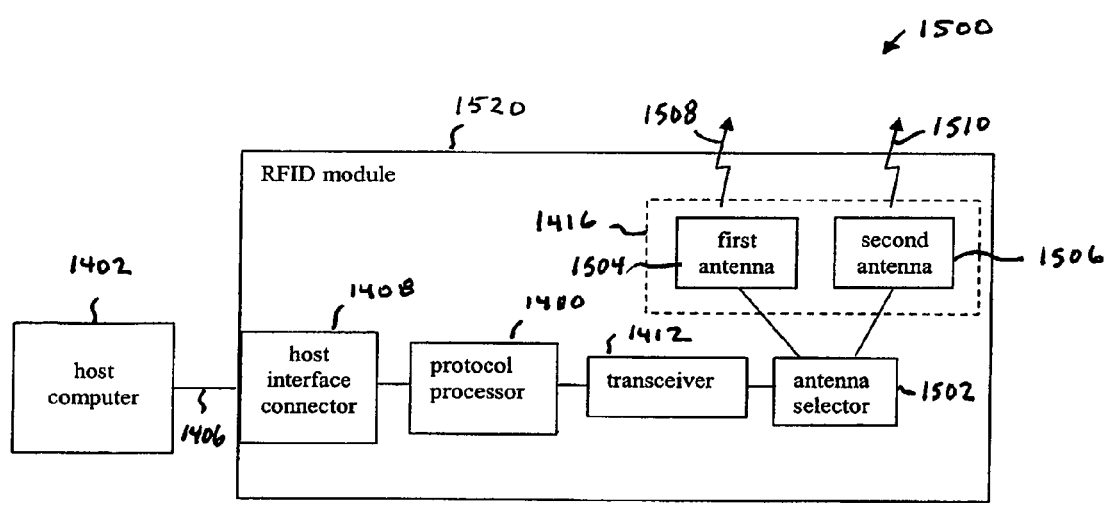

FIG. 15 shows a RFID communication system 1500, according to another example embodiment of the present invention. As shown in FIG. 15, system 1500 is configured generally similarly to system 1400 shown in FIG. 14, with a RFID module 1520 shown in place of RFID module 1402. RFID module 1520 is generally similar to RFID module 1402, with antenna system 1416 including a first antenna 1504 and a second antenna 1506. Furthermore, antenna interface 1414 is shown as an antenna selector 1502.

In an embodiment, first antenna 1504 and second antenna 1506 are configured identically. In another embodiment, first antenna 1504 and second antenna 1506 are configured differently. For example, in an embodiment, first antenna 1504 may be a magnetic field sensitive antenna type, such as a loop antenna, and second antenna 1506 may be an electric field sensitive antenna type, such as a dipole antenna. In this manner, RFID module 1520 includes different types of antennas for different communication environments. For example, second antenna 1506 may be configured to radiate a radio frequency (RF) signal 1510 receivable by RFID tags in a near field region. First antenna 1504 may be configured to radiate a RF signal 1508 receivable by RFID tags in a far field region.

Figure 16:
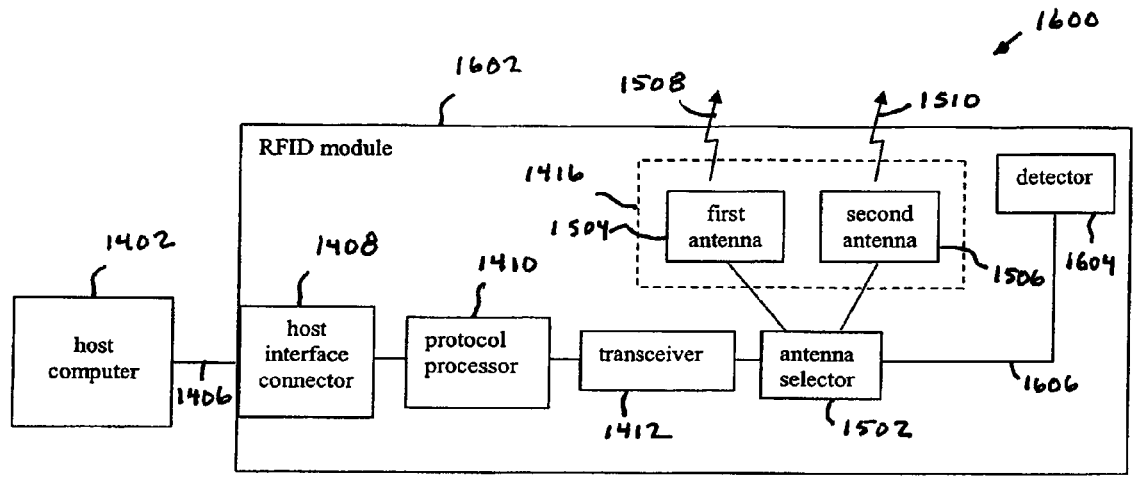

Antenna selector 1502 is coupled between transceiver 1412 and first and second antennas 1504 and 1506. Antenna selector 1502 enables communication between transceiver 1412 and one of first and second antennas 1504 and 1506, depending on which of first and second antennas 1504 and 1506 is desired to be active in a particular situation. Antenna selector 1502 can electronically select one of antennas 1504 and 1506 according to a command from host computer 1402 (e.g., input or triggered by a user of host computer 1402), or by other mechanism. For example, FIG. 16 shows a RFID communication system 1600 configured generally similarly to system 1500 shown in FIG. 15, where a RFID module 1602 includes a detector 1604 coupled to antenna selector 1502. Detector 1604 functions as a trigger (e.g., a trigger module) that can be used to switch first antenna 1504 from being active to second antenna 1506 being active, or to switch second antenna 1506 from being active to first antenna 1504 being active.

For example, in an embodiment, detector 1604 includes a sensor to determine whether RFID module 1602 is positioned adjacent to, or in contact with, an object. In such an embodiment, the sensor may be pressure sensor, an optical sensor, an interrupter switch, a proximity sensor, or other suitable type of sensor. In an embodiment, the sensor may be specifically configured to determine whether RFID module 1702 is positioned in contact with a RFID tag. For example, the sensor may be a capacitive sensor, that senses a change is capacitance when detector 1604 is near or contacted with a tag antenna.

In such embodiments, detector 1604 outputs a detector output signal 1606 to indicate that an object (e.g., a tag) is positioned adjacent to or in contact with detector 1604. Signal 1606 is received by antenna selector 1502. In an embodiment, if detector output signal 1606 does not indicate that an object is positioned adjacent to or in contact with detector 1604 (e.g., detector 1604 is not triggered), antenna selector 1502 enables (e.g., passes a signal from) first antenna 1504, and disables (e.g., does not pass a signal from) second antenna 1506. If detector output signal 1606 does indicate that an object is positioned adjacent to or in contact with detector 1604 (e.g., detector 1604 is triggered), antenna selector 1502 disables first antenna 1504, and enables second antenna 1506. In such an embodiment, first antenna 1504 may be configured to be more efficient at far field reads while second antenna 1506 is configured to be more efficient at near field reads.

Figure 17:
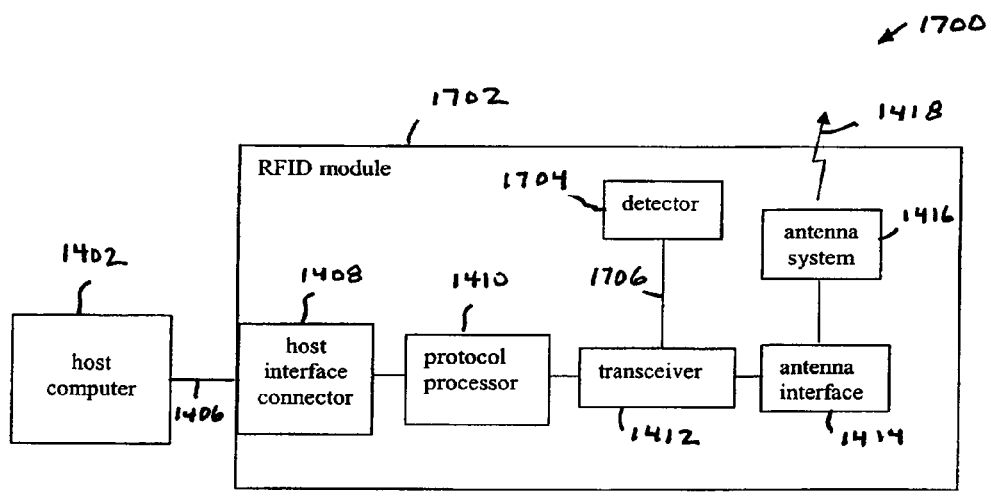

FIG. 17 shows a RFID communication system 1700, according to another example embodiment of the present invention. As shown in FIG. 17, system 1700 is configured generally similarly to system 1400 shown in FIG. 14, with a RFID module 1702 shown in place of RFID module 1402. RFID module 1702 is generally similar to RFID module 1402, with a detector 1704 coupled to transceiver 1412. Detector 1704 outputs a detector output signal 1706 to indicate that an object (such as a tag) is positioned adjacent to or in contact with detector 1704. Detector output signal 1706 is received by transceiver 1412. In an embodiment, if detector output signal 1706 does not indicate that an object is positioned adjacent to or in contact with detector 1704, transceiver 1412 is disabled. If detector output signal 1706 does indicate that an object is positioned adjacent to or in contact with detector 1704, transceiver 1412 is enabled.

In another embodiment, if detector output signal 1706 does not indicate that an object is positioned adjacent to or in contact with detector 1704, transceiver 1412 generates RF communication signals while varying its carrier frequency (i.e., performs frequency hopping) among a plurality of frequencies. If detector output signal 1706 does indicate that an object is positioned adjacent to or in contact with detector 1704, transceiver 1412 significantly reduce output power while hopping or utilizes a single oscillator frequency as a carrier frequency for communication with the object (i.e., does not perform frequency hopping), which may be a tag. In this manner, detector 1704 enables RFID module 1702 to communicate with a nearby or contacted tag without frequency hopping but at significantly reduced RF power levels. As describes above, the communication can occur with a substantial amount of the output transmitter power of RFID module 1702 being conducted into the tag, without radiating substantial power, enabling RFID module 1702 to keep radiated power low enough so as to not be required to frequency hop (according to local regulations, such as FCC regulations in the U.S.).

Figure 18:
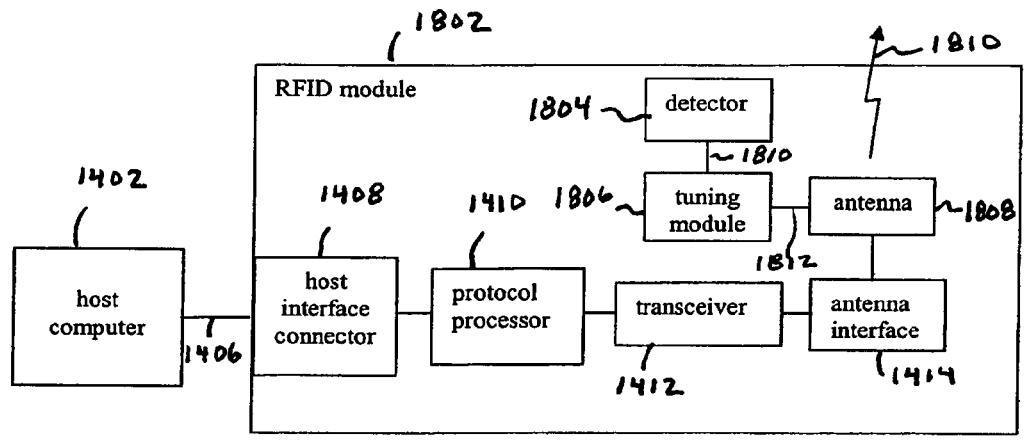

FIG. 18 shows a RFID communication system 1800, according to another example embodiment of the present invention. As shown in FIG. 18, system 1800 is configured generally similarly to system 1400 shown in FIG. 14, with a RFID module 1802 shown in place of RFID module 1402. RFID module 1802 is generally similar to RFID module 1402, with the addition of a detector 1804 and a timing module 1806. In an embodiment, detector 1804 outputs a detector output signal 1810 to indicate that an object (such as a tag) is positioned adjacent to or in contact with detector 1804. Detector output signal 1810 is received by tuning module 1806. If detector output signal 1810 indicates that an object is positioned adjacent to or in contact with detector 1804, tuning module 1806 generates a tuning signal 1812 to tune an antenna 1808 such that antenna 1808 is efficient at radiating energy into the nearby object, and at receiving energy from the nearby object. If detector output signal 1810 indicates that an object is not positioned adjacent to or in contact with detector 1804, tuning module 1806 does not generate tuning signal 1812 to tune an antenna 1808. Thus, antenna 1808 may remain efficient at radiating communication signal into the far field region, if antenna 1808 was originally configured as such.

In another embodiment, antenna 1808 may be configured to be self tuning for efficient near field communications, and thus a separate tuning module 1806 and detector 1804 may not be required. For example, in an embodiment, antenna 1808 may be contacted with a tag. If antenna 1808 is contacted with the tag, antenna 1808 is configured to be tuned by a capacitive loading of the RFID tag to radiate an RF signal receivable by the RFID tag in the near field region. When antenna 1808 is not in contact with the RFID tag, antenna 1808 may remain efficient at radiating communication signal into the far field region.

Figure 19:
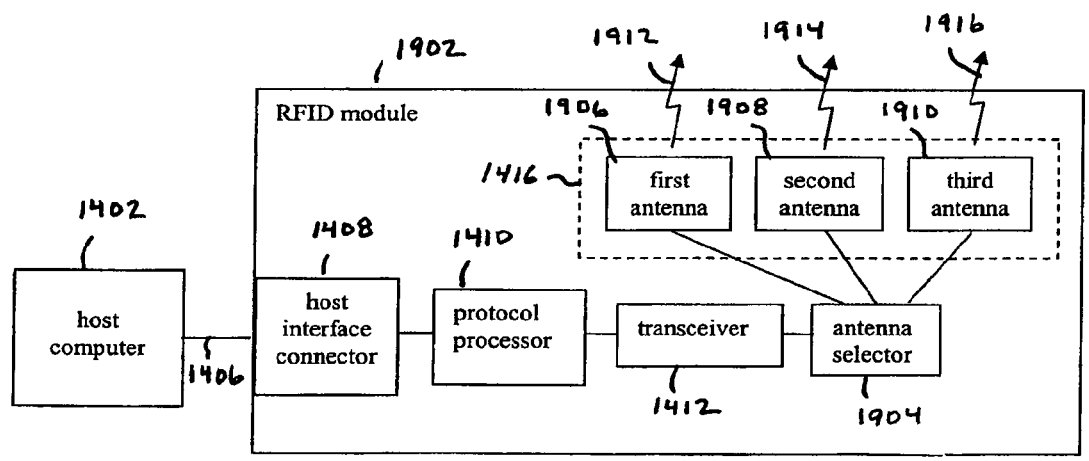

FIG. 19 shows a RFID communication system 1900, according to another example embodiment of the present invention. As shown in FIG. 19, system 1900 is configured generally similarly to system 1500 shown in FIG. 15, with a RFID module 1902 shown in place of RFID module 1520. RFID module 1902 is generally similar to RFID module 1520, with antenna system 1416 including a first antenna 1906, a second antenna 1908, and a third antenna 1910. Furthermore, antenna interface 1414 is shown as an antenna selector 1904.

First, second, and third antennas 1906, 1908, and 1910 may be configured in a variety of ways. For example, in an embodiment first antenna 1906 may be a magnetic field sensitive antenna type, such as a loop antenna, suitable for near field region communications. Second antenna 1908 may be an electric field sensitive antenna type, such as a dipole antenna, suitable for far field region communications. Third antenna 1910 may be configured for near field communications using an electric field, such as for communications with a RFID tag that is adjacent to or in contact with antenna 1910. In this manner, RFID module 1902 includes different types of antennas for different communication environments. For example, although both first and third antennas 1906 and 1910 are suitable for near field region communications, first antenna 1906 may be more efficient at communicating through liquids such as water due to its H-field sensitivity, and may communicate more efficiently with tags that include loop antennas or other H-field sensitive antennas. Because second antenna 1908 is an electric field sensitive antenna type, second antenna 1908 may be more efficient at communications with tags that include dipole antennas or other E-field sensitive antennas.

Antenna selector 1904 enables activation of one of antennas 1906, 1908, 1910 for RF communications in a particular instance. Antenna selector 1904 can electronically select one of antennas 1906, 1908, 1910 according to a command from host computer 1402, according to a detector module similar to detectors 1604, 1704, or 1804, and/or by other mechanism, as would be understood by persons skilled in the relevant art(s) from the teachings herein.

Example Advantages of Embodiments

Numerous advantages are provided by embodiments of the present invention, some of which were described above. Example advantages are described as follows that may or may not have been described above. For example, embodiments have a small size that is easy to integrate into mobile terminals. For example, ASIC and SAW devices can be integrated into a laser scanner engine. Furthermore, the reader circuits can make use of existing laser scanner ASICs, such as being incorporated into the same ASIC, or interfaced with the scanner ASIC in a convenient manner. The reader transceiver circuits use very low power. For example, the power used is approximately the same as used by a laser scanner. The reader embodiments are very light weight. Embodiments can be integrated into a SANDISK™ (SD) format card to upgrade numerous existing products and devices that are compatible with SD cards. Furthermore, due to reduced interference, embodiments allow more RFID terminal sales into a given volume of space.

In a UHF reader embodiment, unlike other EPC UHF readers, the transmitting frequency may be fixed (i.e., a single frequency), making the radio design very simple. The "fixed" transmit frequency does not necessarily need to be centered at the resonant frequency of a tag. For example, a 2.4 GHz radio or 440 MHz radio may be used.

The reader antenna (e.g., antenna 422) may include an "inductive" coil pattern to operate at UHF frequencies or at 13 MHz for HF tags, and the transmitter/receiver section, likewise, can include features for reading both UHF and HF tags, such as a dual mode radio design.

A UHF antenna with very high Q can be used so as to be selective at a desired fixed frequency, as well as a low gain UHF antenna that is normally part of a transmission line that only radiates when a tag is in contact to disturb the local field.

Embodiments can be implemented in a barcode scanner, that use a dual position trigger of the scanner to select RFID or scanner operation.

A dip sensor can be used to remove the need for a trigger, with a power step feature for tag detection, and/or other proximity sensor concepts can be used.

Carrier AGC (automatic gain control) can be used to improve S/N (signal-to-noise) as needed, so as to keep transmission power to a minimum, and to use power when needed.

Embodiments can be combined with continuous time signal processing techniques, or other techniques, to simplify the transceiver circuit electronics and to eliminate the need for a DSP (digital signal processor), and to produce DBF (digital barcode pattern) like signals that can be processed with today's low cost decoder CPUs, and/or share a common baseband receiver and edge detector with a laser scanner, or linear imager.

The transmit spectrum can be spread with simple techniques that take advantage of a coherent relationship produced in embodiments, thereby allowing more power on the transmit side while providing a security feature.

In embodiments, a baseband receiver with programmable filters and gain can be used, an RF transmitter with programmable output power can be used, and/or an edge detector that can handle the signal and the inverted signal may be used.

As described above, embodiments can be packaged or implemented in SD card format. Furthermore, embodiments can be packaged or implemented in a compact flash card, or packaged as an "RFID engine". The RFID engine could be used as a mobile computing accessory, a scanner "chin module", or module mounted internal to the mobile device. The engine could use adapters (e.g., interface modules 1116, 1118, and 1120) to enable it to be customized to each unique form factor.

Embodiments may be packaged on a rigid or flexible substrate, such as described with respect to FIG. 12. For example, a flex substrate may include an antenna strip (trace in flex). The flex substrate can be adhered to the inside contours of existing or new housings. Embodiments can have multiple antenna strips supporting multiple frequencies, if desired. Antenna strips may be optimized for contact reading, as well as for close range reading, such as 0 to 3" or 0 to 6" read ranges.

Embodiments for the reader engine can communicate with a host device (scanner, mobile computer, etc.) via conventional connector/contacts, via a personal area network (PAN) (e.g., BLUETOOTH), local area network (LAN) (e.g., 802.11), or other network. For example, embodiments may utilize a PAN network so that it could be located/integrated onto host devices independent of existing accessory I/O connectors. It may house it own independent power supply, or share a power supply, if desired A motion sensor, such as a "MEMS" (micro-electromechanical system) motion sensor, may be present for enhanced power management. For example, a motion sensor may enable the device to go into sleep mode when no motion is being detected.

Conventional systems tend to perform "far field" reads of tags. According to embodiments, as described above, a "near field" read can be performed (or very short far field read). A space or region immediately surrounding an antenna in which reactive components predominate, is known as the reactive near field region. The size of this region varies for different antennas. For most antennas, however, the outer limit of a near field read is on the order of a few wavelengths or less. Beyond the reactive near field region, the "radiating field" predominates. The radiating region is divided into two sub-regions, the "radiating near field" region and the "far field" region. In the radiating near field region, the relative angular distribution of the field (the usual radiation pattern) is dependent on the distance from the antenna. In a far field region, the relative angular distribution of the field becomes independent of the distance.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system (e.g., a reader or host) using a removable storage drive, hard drive, or communications interface. The control logic (software), when executed by a processor, causes the processor to perform the functions of the invention as described herein.

According to an example embodiment, a reader may execute computer-readable instructions to read tags, as described above. Furthermore, in an embodiment, a tag may execute computer-readable instructions to respond to a reader transmitted signal, as further described elsewhere herein.

CONCLUSION

While various embodiments of the present invention have been described above, it should, be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) module for communicating with RFID tags, comprising:
    a transceiver;
    a protocol processor to process tag data coupled to the transceiver;
    an antenna system coupled to the transceiver; and
    a barcode reader interface coupled to the protocol processor, wherein the barcode reader interface includes an interface circuit configured to exchange information with a host system, wherein the barcode reader interface is configured to transmit tag data to the host system in a signal format that emulates a signal format generated by a barcode reader.

* * * * *

UNITED STATES PATENT AND TRADEMARK OFFICE
CERTIFICATE OF CORRECTION

PATENT NO.         : 7,902,984 B2                             Page 1 of 1
APPLICATION NO.    : 12/498884
DATED              : March 8, 2011
INVENTOR(S)        : Duron et al.

It is certified that error appears in the above-identified patent and that said Letters Patent is hereby corrected as shown below:

On the Title Page, in Item (56), under "OTHER PUBLICATIONS", in Column 2, Lines 2-3, delete "Restriction dated........11/529,733." and insert the same at Line 3 as a new entry.

In Column 16, Line 59, delete "First," and insert -- First --, therefor.

In Column 17, Line 3, delete "second," and insert -- second --, therefor.

In Column 20, Line 66, delete "timing" and insert -- tuning --, therefor.

Signed and Sealed this
First Day of January, 2013

David J. Kappos
*Director of the United States Patent and Trademark Office*